Oct. 10, 1950   J. H. H. VOSS   2,525,054
VALVE

Filed April 19, 1945   2 Sheets-Sheet 1

INVENTOR
Johann Heinrich Hermann Voss
BY
J. B. Felslin
ATTORNEY

Oct. 10, 1950     J. H. H. VOSS     2,525,054
VALVE

Filed April 19, 1945                        2 Sheets-Sheet 2

INVENTOR
Johann Heinrich Hermann Voss
BY
ATTORNEY

Patented Oct. 10, 1950

2,525,054

UNITED STATES PATENT OFFICE 2,525,054

VALVE

Johann Heinrich Hermann Voss,
White Plains, N. Y.

Application April 19, 1945, Serial No. 589,182

8 Claims. (Cl. 230—231)

This invention relates to valves. It is particularly directed to suction and discharge valves for compressors and the like machines.

An object of this invention is to provide a valve comprising a cast piston or body, a valve guard screwed thereto, and a valve seat screwed to the valve guard, and contacting the piston or body, the mutually contacting surfaces between the piston or body and valve seat being ground, whereby to provide largest possible valve plates giving large passage area with low valve lift and providing a simple and safe assembly of the guard and seat.

Another object of this invention is to provide a valve of the character described, comprising a piston or body, a valve seat member, and a valve guard member, one of the members being screwed to the piston or body, and the second member being screwed to the first member.

A further object of this invention is to provide a valve construction of the character described, comprising a cast piston or body and a valve seat attached thereto, the valve seat and body having mutually contacting complementary ground surfaces.

Yet another object of this invention is to provide a suction and discharge valve construction for a compressor, wherein the suction valve seat is screwed onto the valve guard which in turn is screwed onto the piston casting, the discharge valve assembly being held in an intermediate plate disposed between the cylinder and the discharge valve cover.

Yet a further object of this invention is to provide a strong, rugged and durable valve construction of the character described, which shall be relatively inexpensive to manufacture, easy to assemble, and which shall yet be practical and efficient to a high degree in use.

Other objects of this invention will in part be obvious and in part hereinafter pointed out.

The invention accordingly consists in the features of construction, combination of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is an axial cross-sectional view of suction valve structure embodying the invention;

Figure 1:
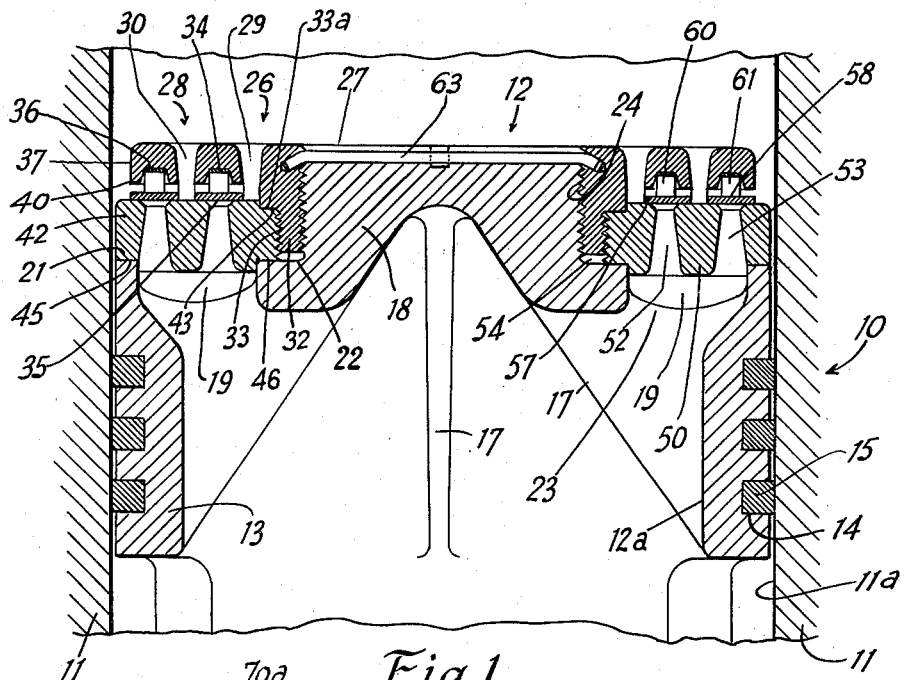

Referring now in detail to the drawing, 10 designates a portion of a suction valve embodying the invention. Said figure for the purpose of illustration, shows a valve for a vertical single acting ammonia compressor. The structure 10 comprises a cylinder 11 and a piston 12. The piston 12 comprises a body or casting 12a having a cylindrical wall 13 formed with a series of external annular grooves 14 for piston rings 15 which engage the inner surface 11a of the cylinder 11. Integrally formed with the cylindrical portion 13 of the piston body 12a are radial webs 17 carrying a central boss 18 projecting beyond one end of the body. Between the webs 17 are passages 19. At one end of the piston are ground annular concentric surfaces 21 and 22 on the outside and inside, respectively, of the passages 19. The webs 17 are recessed as at 23 between the surfaces 21 and 22. The surfaces 21 and 22 are in a common plane perpendicular to the axis of the piston. Boss 18 is formed with external screw threads 24 as shown in the drawing.

Screwed to the boss 18 is an annular valve guard 26. The valve guard 26 has a central internally screw threaded opening 27 engaging the threads 24 of said boss. The valve guard 26 is furthermore formed with an outwardly extending annular flange 28 formed with an inner row of arcuate slots 29 and an outer row of arcuate slots 30 concentric with respect to the inner row. The central portion of member 26 extends below flange 28 to form a flange 32. It is formed on the underside thereof with a shoulder 33a. Flange 32 is formed with external screw threads 33 for the purpose hereinafter appearing.

Flange 28 is formed on the underside thereof with an annular groove 34 between the slots 29 and 30. Groove 34 has chamfered inner and outer surfaces 35. Flange 28 is furthermore formed with an annular groove 36 between arcuate slots 30 and the outer peripheral edge 37 of said flange. Groove 36 likewise has chamfered inner and outer surfaces 40. Screwed to the threaded portion 33 of flange 32 is an annular, ring shaped valve seat 42. Valve seat 42 has an annular shoulder 43 contacting shoulder 33a. Valve seat 42 has on the underside thereof annular ground surfaces 45 and 46 contacting the ground surfaces 21 and 22 on the piston body or casting, respectively. Abutting surfaces 33a, 43 are also ground.

Between ground surfaces 45, 46, valve seat 42 is formed with a portion 50 projecting between the ground surfaces 21 and 22. The valve seat is furthermore formed with inner and outer concentric circular rows of arcuate passages 52 and 53 aligned with grooves 34 and 36, respectively. It will be noted that the lower edge of flange 32 terminates short of the ground surface 22 so as to provide a space 54 between the valve guard and said surface 22 of the piston casting. On the valve seat are inner and outer concentric circular valve plates 57 and 58. Interposed between the valve plate and the valve guard are valve strip springs 60 and 61 projecting into the grooves 34 and 36, respectively. The springs 60 and 61 may be constructed as shown in my copending application Serial No. 589,191, filed April 19, 1945, now abandoned.

The valve guard 26 may be locked to the piston casting by a wire lock 63 of usual construction. The advantages of the above-mentioned construction are: (1) large valve plates can be used giving large passage area with lower valve lift, (2) the assembly is simple and safe, (3) the ground joints make a perfect fit, (4) the valve seat is separated from the piston body, (5) the double ground joint may be easily reground in the field.

The valve seat is first screwed onto the valve guard. The valve guard is then screwed onto the boss 18 until the ground surfaces of the valve seat contact the ground surface of the piston body.

Figure 2:
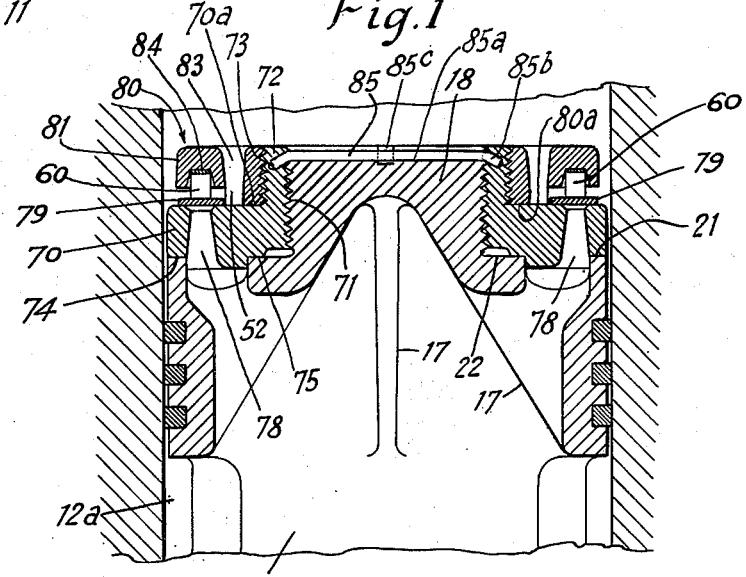
Fig. 2 is a view similar to Fig. 1, but illustrating a modified construction.

In Fig. 2 there is illustrated a modified form of the invention. In Fig. 2 the piston 12 is likewise formed with a boss 18. In this construction, a valve seat member 70 is screwed onto the boss 18. Valve seat 70 has an internal screw threaded opening for this purpose. It is furthermore formed with an upwardly extending flange 72 having external screw threads 73. The valve seat 70 has on its underside, ground surfaces 74 and 75, contacting the ground surfaces 21 and 22, respectively, of the piston body. Said valve seat 70 is formed with a series of arcual passages 78. On the valve seat is a valve plate or ring 79.

Screwed to the threaded portion 73 of flange 72 is an annular guard 80. Valve guard 80 has an outwardly extending flange 81 formed with an undersurface 82 spaced from the valve seat. Valve guard 80 is formed with a circular row of arcual passages 83. The flange 81 is formed on its underside with an annular groove 84 to receive a valve spring 60 such as shown in my copending application Serial No. 589,191, filed April 19, 1945. The valve spring is interposed between the valve plate 79 and said valve guard. The valve seat may be attached to the boss 18 by a usual wire lock 85. It will thus be understood that in the modification of Fig. 2 the valve seat is screwed directly to the piston casting and the valve guard is screwed onto the valve seat. Here, likewise, the valve seat has a ground joint connection to the piston casting. The underside 80a of the valve guard 80 is ground and abuts a ground surface 70a at the upper side of the valve seat 70.

Figure 3:
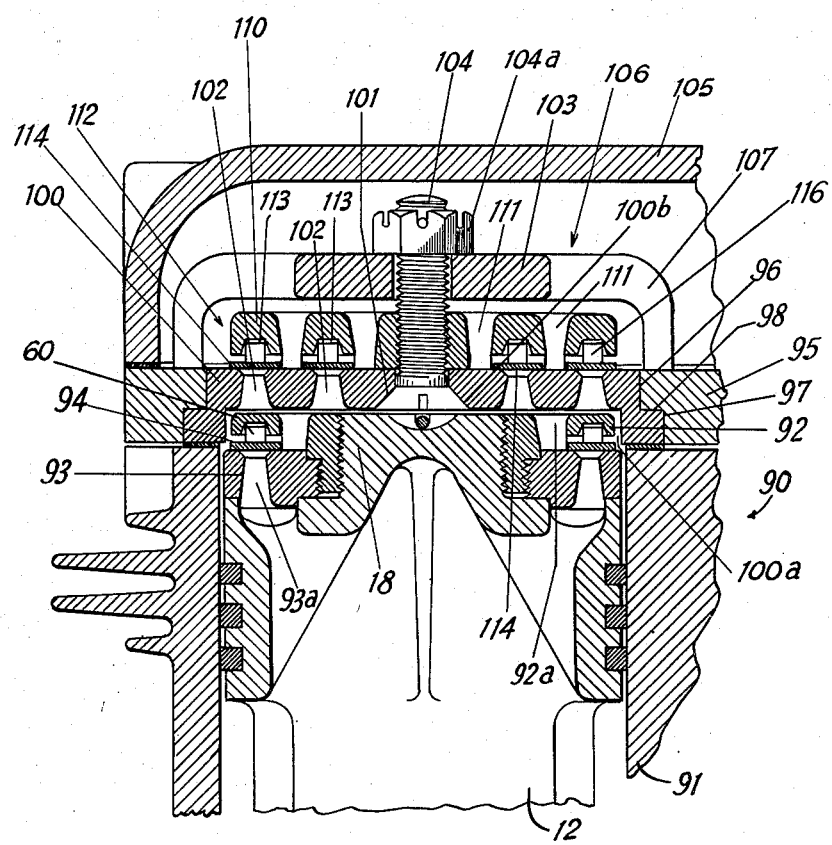
Fig. 3 is a view similar to Fig. 1 of a discharge and suction valve embodying the invention.
Figure 4:
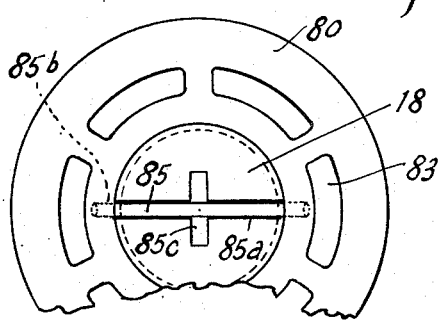
Fig. 4 is a top plan view of the piston and valve structures shown in Fig. 2.

In Fig. 3 there is shown a suction and discharge valve 90 for an ammonia, vertical, single acting compressor or the like compressor. The construction 90 comprises a cylinder 91 in which there reciprocates a piston 12 similar to the piston construction described above. Screwed to the piston 12 is a valve guard 92 similar to the valve guard 26 except that it is formed with only one set of passages and one groove on its underside. Screwed to the valve guard 92 is a valve seat 93 similar to valve seat 42 except that it is formed with only one set of passages instead of two sets.

The valve seat has ground surfaces on its underside contacting the ground surfaces of the piston, the same as in Fig. 1. The valve guard is locked to the boss 18 by a usual wire lock. On the valve seat is a single annular valve plate 94 and interposed between said valve plate and the valve guard are the strip valve springs 60.

At the upper end of the cylinder is a plate 95 fixed to the cylinder in any suitable way. The plate 95 is formed with an annular opening 96 formed with an enlarged portion 97. Between opening 95 and the enlarged portion 97 is an annular shoulder 98.

Within opening 96 is a valve seat 100 for a discharge valve. Said valve seat has an annular flange contacting shoulder 98 and is clamped by plate 95 to the cylinder body. The valve seat 100 constitutes an end plate for the cylinder and may be formed with a central countersunk opening 101, and with two concentric sets of annularly arranged arcuate passages 102. On the plate 95 is a clamp 103. Interconnecting the valve seat 100 and the clamp 103 is a central bolt 104 passing through an opening in the clamp. Over the clamp 103 is a cylinder cover 105. The clamp 103 has a top portion 106 spaced from the valve seat. Said clamp furthermore has curved legs 107 contacting plate 95. The valve seat 100 is formed with a recess 100a on its underside to receive the valve guard 92 when the piston is at the end of its compression stroke. It will be noted that plate 100 is countersunk as at 100b on its underside to receive the head of the bolt 104. Furthermore a nut 104a screwed to the upper end of the bolt serves to press the clamp 106 down against the plate 95 and hold the discharge valve securely in position.

Screwed to the shank of the bolt 104 and interposed between plate 100 and clamp 106 is a valve guard 110 for the discharge valve. The valve guard 110 is formed with two concentric circular rows of arcuate slots 111 staggered with respect to the arcuate slots or passages 102. The valve guard 110 furthermore has a flange portion 112 spaced above plate or valve seat 100. The flange 112 is formed on its underside with concentric grooves 113 overlying the passages 102. On the valve seat 100 are circular valve plates or rings 114 overlying the passages 102 and normally closing the same. Interposed between the valve plates 114 and the flange 112 of valve guard 110 are strip springs 116 similar to the springs shown in my copending application Serial No. 589,191. The springs 116 project into the grooves 113.

The action of the device will now be understood. As the piston moves downwardly, the discharge valve is closed. However, the suction valve will open to permit passage of gases through the passages 93a in the valve seat 93 and passages 92a of the valve guard 92 and the outside circumferential opening of valve plate 94 which offers a large passage area for the entering gas or fluid. As the piston moves up toward the upper end of the stroke and the valve plates 114 will be unseated and the gases will pass through passages 102 and 111.

It will be noted that member 18 is formed with a transverse groove 85a in its upper surface, to receive wire 85. The ends of wire 85 are received in drilled holes 85b in the valve guard. Said member 18 is also formed with a groove 85c in its upper surface transverse to the groove 85a to admit a tool for lifting out the wire lock.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. An annular body formed at its center with an outwardly projecting externally threaded boss and about said boss being formed with openings that are spaced from each other circumferentially of the body, a valve seat resting upon said body and formed with a centrally located threaded opening through which said boss passes and concentric with its central opening being formed with inner and outer rows of passages spaced from each other circumferentially of the body, an annular valve guard over said body having a central opening surrounded by a sleeve projecting from the guard and being formed with internal and external threads and screwed upon the center boss of the body and into the threaded opening of the valve seat, said sleeve being surrounded by a shoulder bearing against the valve seat and limiting movement of the sleeve through the valve seat, said guard being formed with inner and outer rows of circumferentially extending openings and having portions over the openings of the valve seat spaced upwardly from the valve seat and formed in their under faces with circumferentially extending grooves constituting spring seats, valve plates under the spring seats normally resting upon the valve seat in closing relation to the openings in the valve seat, and springs seated in said spring seats with portions projecting therefrom and engaging said valve plates and yieldably holding the valve plates in closed position.

2. A body formed with an outstanding threaded boss and about the boss being formed with openings, a valve seat formed with a threaded opening through which said boss passes and about its opening being formed with passages spaced from each other circumferentially, a valve guard over said valve seat formed with an opening surrounded by a sleeve internally and externally threaded and screwed upon the boss and into the opening of the valve seat and having portions spaced from the valve seat and being formed with spring seats over the passages of the valve seat, a valve plate fitting between the guard and the valve seat and normally resting upon the valve seat in closing relation to the passages in the valve seat, and springs seated in the spring seats and engaging the valve plate and yieldably holding the valve plate in its closed position against the valve seat.

3. A body formed with an outstanding boss and about the boss being formed with openings, a valve seat resting upon said body and formed with passages registering with the openings in the body, said valve seat being formed with an opening through which the boss passes, a valve guard over the valve seat surrounding said boss and detachably connected with the boss, said valve guard having a portion fitting into the opening of the valve seat and detachably connected therewith for removably holding the valve seat upon said body, said guard having portions spaced upwardly from the valve seat and formed with spring seats, closure means for the passages in the valve seat disposed under the upwardly spaced portions of the valve guard and movable into and out of position to rest upon the valve seat and close its passages, and springs mounted in the spring seats and engaging the closure means to yieldably hold the closure means in closed position.

4. A body formed with an outstanding boss and with openings about the boss, a valve seat resting upon said body and formed with an opening through which the boss passes and with passages registering with the openings in the body, a valve guard over said valve seat fitting about the boss and having a threaded sleeve screwed onto the boss and into the opening of the valve seat, said sleeve having its lower end spaced upwardly from the body, a portion of the guard about the sleeve bearing against the valve seat and applying pressure to hold the valve seat against the body, there being spaces between the valve guard and the valve seat, and closure means in said spaces normally closing the passages in the valve seat and shiftable upwardly to an open position.

5. A body formed with an outstanding boss and with openings about the boss, a valve seat resting upon said body and formed with passages cooperating with the openings in the body, a guard over said valve seat screwed upon the boss and detachably connected with the valve seat for applying pressure against the valve seat to hold the latter against said body, said guard being formed with spaces over the passages of the valve seat, outwardly opening closures for said passages and spring means for yieldably holding the closures closed over the passages in the valve seat.

6. A body formed with a boss and with openings about the boss, a valve seat resting upon said body and formed with passages cooperating with the openings in the body, a valve guard over said valve seat formed with spaces above the passages in the valve seat, said valve seat and said guard being secured to each other and one being secured upon the boss, whereby the valve seat and the guard are removable from the body as a unit and detachable from each other, outwardly opening closure means for the passages mounted between the valve seat and the guard and spring means for yieldably holding said closures closed over said passages.

7. A body formed with a boss and with openings about the boss, a valve seat resting upon said body and formed with passages cooperating with the openings, a valve guard resting upon said valve seat and formed with spaces over said passages, said valve seat and said guard being detachably connected with each other by a threaded connection, one of said members being screwed upon the boss, whereby the valve seat and the guard are removable from the body as a unit, outwardly opening closure means for said passages mounted in said spaces and spring means for yieldably holding said closures closed over said passages.

8. A piston of a reciprocating compressor having on its working side a coaxial boss and a face concentric with the boss, said face being formed with an opening, the sections of the face on both sides of the opening lying on the same surface, a valve assembly comprising a valve seat member contacting said face of the piston on both sides of said opening annularly, and a valve guard member joined to the valve seat member, said valve seat and valve guard members being centered to each other on mutually contacting surfaces coaxial to the piston, and the valve assembly being attached to the piston by engagement of one of its members to said boss by means of a screw thread.

JOHANN HEINRICH HERMANN VOSS.

REFERENCES CITED

The following references are of record in the file of this patent:

UNITED STATES PATENTS

| Number | Name | Date |
|---|---|---|
| 917,798 | Rumsey | Apr. 13, 1909 |
| 1,396,079 | Warnock | Nov. 8, 1921 |
| 1,489,912 | Winkler | Apr. 8, 1924 |
| 1,650,494 | Dally | Nov. 22, 1927 |